United States Patent [19]

Lodico

[11] 4,409,116
[45] Oct. 11, 1983

[54] WINDSHIELD WIPER CLEANING PRODUCT

[76] Inventor: Richard Lodico, 20 Track Rd., Reading, Mass. 01867

[21] Appl. No.: 409,330

[22] Filed: Aug. 18, 1982

[51] Int. Cl.$^3$ ............................................. C11D 17/00
[52] U.S. Cl. ......................................... 252/91; 252/90; 252/548; 252/153; 252/162; 252/170; 252/171; 252/174.13; 252/DIG. 10; 206/812
[58] Field of Search ................... 252/90, 91, 541, 548, 252/153, 158, 162, 164, 166, 172, 171, 173, 174.13, DIG. 10; 15/104.93, 104.94; 428/72, 76; 206/604, 632, 812, 524

[56] References Cited

U.S. PATENT DOCUMENTS

| | | | |
|---|---|---|---|
| 1,455,574 | 5/1923 | Eastman | 252/153 |
| 1,659,913 | 2/1928 | Grosvenor | 252/153 |
| 1,980,043 | 11/1934 | Ellis | 252/166 |
| 2,585,165 | 2/1952 | Peters | 252/541 |
| 3,129,811 | 4/1964 | Williams | 206/812 |
| 3,398,826 | 8/1968 | Clancy | 206/46 |
| 3,463,735 | 8/1969 | Stonebraker et al. | 252/171 |
| 3,696,042 | 10/1972 | Wright | 252/153 |
| 3,806,460 | 4/1974 | Mukai et al. | 252/DIG. 10 |
| 4,220,244 | 9/1980 | Elmore | 206/812 |
| 4,313,841 | 2/1982 | Speigel et al. | 252/153 |

Primary Examiner—John E. Kittle
Assistant Examiner—Hoa Van Le

[57] ABSTRACT

Product for cleaning windshield wiper blades which includes a single use packaged cleansing unit including a sheet or towelette of liquid absorbant material impregnated with a windshield wiper cleaning liquid and enclosed in a sealed, tearable, gas-tight envelope. The cleaning liquid contains an aqueous solution of ammonium hydroxide which is of a concentration between 0.1N and 3N, the ammonium hydroxide solution making up between 10% and 50% of the liquid by volume; acetone making up between 30% and 80% of the liquid by volume; and an alcohol having 1–5 carbon atoms, inclusive, the alcohol making up between 2% and 50% of the liquid by volume.

6 Claims, 1 Drawing Figure

U.S. Patent     Oct. 11, 1983     4,409,116
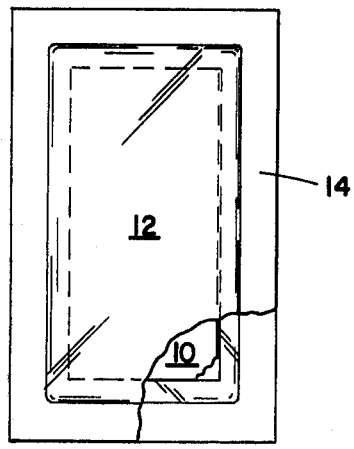

WINDSHIELD WIPER CLEANING PRODUCT

BACKGROUND OF THE INVENTION

This invention relates to cleaning windshield wiper blades.

Various products have been used to clean automobile windshield wiper blades. One such product, described in Wright U.S. Pat. No. 3,696,042, contains methanol and diethylene glycol. Another product employs a cleaning solution in combination with a piece of abrasive screening.

SUMMARY OF THE INVENTION

In general, the invention features a product for cleaning windshield wiper blades which includes a single use packaged cleansing unit including a sheet or towelette of liquid absorbant material impregnated with a windshield wiper cleaning liquid and enclosed in a sealed, tearable, gas-tight envelope; the cleaning liquid contains an aqueous solution of ammonium hydroxide which is of a concentration between 0.1 N and 3 N, the ammonium hydroxide solution making up between 10% and 50% of the liquid by volume; acetone making up between 30% and 80% of the liquid by volume; and an alcohol having 1-5 carbon atoms, inclusive, the alcohol making up between 2% and 50% of the liquid by volume.

In preferred embodiments, the sheet of material is absorbant paper which is folded within a rectangular envelope; the liquid contains 1.5% to 2%, by volume, of a fragrant oil such as eucalyptus or wintergreen; and the liquid contains 1 N ammonium hydroxide, methanol, and acetone in a 1:1:1 volumetric ratio.

The windshield wiper cleaning product of the invention is extremely effective in thoroughly cleaning the windshield wipers of cars, truck, buses, etc. of common dirt and road film, as well as of harder to remove materials such as road tar. The product of the invention accomplishes this without the use of abrasives which might damage wipers. The product leaves no precipitate and the wipers dry almost instantaneously after they have been cleaned. Furthermore, as each towelette is used only once and then disposed of, the cleaning procedure is essentially mess-free. In addition, the product is very inexpensive; the liquid impregnating one towelette costs on the order of two cents.

Other features and advantages of the invention will be apparent from the following description of the preferred embodiment, and from the claims.

DESCRIPTION OF THE PREFERRED EMBODIMENT

We first briefly describe the drawing.

DRAWING

The FIGURE is a plan view of a windshield wiper blade cleaning product of the invention, partially broken away to show the cleaning liquid-impregnated towelette.

STRUCTURE

Referring to the FIGURE, tough, flexible sheet 10 of fibrous absorbant paper is impregnated with a windshield wiper cleaning liquid containing 1 N ammonium hydroxide, methanol, and acetone, in the volumetric ratio 1:1:1. These three ingredients together make up 98.5% of the liquid, by volume. The remaining 1.5% of the liquid is made up of eucalyptus oil to provide a pleasant fragrance. The impregnated towelette 10 is folded and enclosed in rectangular, sealed gas tight envelope 12, having fused periphery 14, in a manner such as is described in Clancy U.S. Pat. No. 3,398,826 or Williams U.S. Pat. No. 3,057,467, hereby incorporated by reference.

Operation

In operation, sealed envelope 12 containing the impregnated towelette 10 is torn open and the towelette is removed, applied to a windshield wiper at one end and wiped along its length. The soiled towelette and package 12 are then discarded. The cleaned windshield wiper dries almost immediately and no film is left on the wiper or on the windshield.

Other Embodiments

Other embodiments are within the following claims. For example, the impregnated sheet can be, in addition to absorbant paper, another suitable absorbant material such as unwoven fabric. Higher alcohols, e.g. ethanol and propanol are also suitable but are less desirable because of their comparatively greater expense. The proportions of the ingredients can be varied within the stated ranges in order to address specific problems. For example, comparatively more acetone might be used in the cleaning liquid of a product designed for highway-going trucks whose windshield wipers would be expected to pick up an unusually large amount of organic materials such as road tar.

I claim:

1. A product for cleaning windshield wiper blades comprising a single use packaged cleansing unit comprising a sheet of liquid absorbant material impregnated with a windshield wiper cleaning liquid,
   said sheet of material being enclosed in a sealed, tearable, gas-tight envelope,
   said windshield wiper cleaning liquid comprising
      an aqueous solution of ammonium hydroxide which has a concentration between 0.1 N and 3 N, said ammonium hydroxide solution comprising between 10% and 50% of said liquid, by volume,
   acetone, said acetone comprising between 30% and 80% of said liquid, by volume, and
   an alcohol having between one and five carbon atoms, inclusive, said alcohol comprising between 2% and 50% of said liquid, by volume.

2. The product of claim 1 wherein said sheet of material is absorbant paper which is folded within said envelope, said envelope being rectangular.

3. The product of claim 1 wherein said liquid further comprises a fragrant oil, said oil comprising between 1.5% and 2% of said liquid, by volume.

4. The product of claim 3 wherein said fragrant oil is eucalyptus oil.

5. The product of claim 3 wherein said fragrant oil is wintergreen oil.

6. The product of claim 1 or claim 3 wherein
   said aqueous solution of ammonium hydroxide is 1 N, said alcohol is methanol, and
   said aqueous solution of ammonium hydroxide, said methanol, and said acetone are present in said cleaning liquid in the volumetric ratio 1:1:1.

* * * * *